United States Patent [19]

Yoshino et al.

[11] 4,435,215

[45] Mar. 6, 1984

[54] HEAT-RESISTANT INORGANIC COMPOSITIONS

[75] Inventors: Shigeo Yoshino; Tadashi Zenbutsu; Hajime Asami, all of Bizen; Michiyuki Irie, Oku, all of Japan

[73] Assignee: Shinagawa Refractories Co., Ltd., Tokyo, Japan

[21] Appl. No.: 387,555

[22] Filed: Jun. 11, 1982

[30] Foreign Application Priority Data

Jun. 17, 1981 [JP] Japan ................................ 56-92384

[51] Int. Cl.$^3$ .............................................. C04B 19/04
[52] U.S. Cl. ........................................ 106/84; 106/85
[58] Field of Search .................................. 106/84, 85

[56] References Cited

U.S. PATENT DOCUMENTS

| | | | |
|---|---|---|---|
| 3,130,061 | 4/1964 | McMahon et al. | 106/84 |
| 3,549,395 | 12/1970 | Sears et al. | 106/84 |
| 3,721,574 | 3/1973 | Schneider | 106/84 |

FOREIGN PATENT DOCUMENTS 565167 1/1981 Japan ................................ 106/84

*Primary Examiner*—James Poer
*Attorney, Agent, or Firm*—Armstrong, Nikaido, Marmelstein & Kubovcik

[57] ABSTRACT

The invention provides a novel composition useful as a heat-resistant coating material for a metal or ceramic article surface. Also, the novel composition is useful as an adhesive agent for bonding metal articles, ceramic articles or articles of a metal and a ceramic. The adhesive strength of the composition is so strong that no peeling takes place even after many times of repeated cycles of rapid heating and quenching. The composition comprises a metal powder, such as iron, copper and silver; a powdery inorganic compound having cation-exchangeability and a layered structure, such as mica; and a binder of an alkali metal silicate or aluminate. The maximum particle diameter of the layered inorganic compound having a layered structure is important and relative to the average particle diameter of the metal powder.

6 Claims, No Drawings

HEAT-RESISTANT INORGANIC COMPOSITIONS

BACKGROUND OF THE INVENTION

The present invention relates to a heat-resistant inorganic composition or, more particularly, to a heat-resistant composition useful as a coating material which is capable of being firmly and adhesively bonded to the surface of metals, such as iron, copper, silver, etc., and inorganic materials, such as glass, etc. The inventive composition is also useful as an adhesive agent for bonding metals or for bonding a metal and an inorganic fiber or a ceramic material such as a refractory, glass, etc.

In the prior art, various attempts have been made to develop a heat-resistant inorganic coating composition containing metals for preventing the oxidation and for improving the heat conductivity of trays, which are used in firing ceramic products and carbonaceous articles. Also, attempts have been made to develop a coating material for preventing corrosion of steel-made heat exchangers at high temperatures.

In particular, attempts have been made to coat the surface of a ceramic article with a metal in order to utilize the electric and thermal characteristics inherent in metals. Also, attempts have been made to obtain an adhesive bonding between graphite and metal or between glass and metal. Coating of the surface of a ceramic article with a metal has, however, only been performed with great difficulties. Known methods for providing a metallic coating onto the surface of a ceramic article include the methods of, for example, spray fusion, chemical vapor deposition (CVD), metal ion migration, electroless plating, vacuum deposition, sputtering, ion brazing and the like.

These methods are, however disadvantageous due to the difficulties of their various coating procedures, which difficulties are especially apparent in the coating of large articles. Accordingly, from an industrialization point of view, the known methods of providing a metal coating on a ceramic substrate have not been satisfactory.

The adhesive bonding of the metal, such as iron, copper, silver and the like, and a ceramic, ceramic fibers, glass and the like, on the other hand, has been usually performed by use of a solder glass. The problems in soldering with solder glass are the necessity of maintaining a high temperature of 400° to 500° C. or higher. The use of a solder glass is also extremely difficult when bonding of an article of a complicated form or large size, as well as in the bonding of ready-built materials. Therefore, the possibility of performing the soldering at lower temperatures has been investigated. However, these investigations have not developed practically satisfactory results. Moreover, solder glass has the undesirable characteristic, especially when bonding metals together, that the desirable properties of the bonded metals are less. Accordingly, the adhesive bonding of metals has been desirably performed by the use of an adhesive agent composed of the same type of metals to be bonded, in order to retain the inherent properties of the bonded metals.

Known heat-resistant metal-containing inorganic adhesives materials include a coating composition comprising zinc silicate which is capable of being coated on an iron surface which is resistant to temperatures of up to 540° C., and a coating composition composed of powders of metallic aluminum and iron (III) oxide (see, for example, Japanese Patent Kokai 55-5167 and Material Performance, May, 1975, page 25–29).

Hitherto, there has not been known a metal-containing heat-resistant inorganic composition having the desirable properties that it is capable of being coated on a metal surface or an inorganic material surface, that it can be used as an adhesive agent between metals or between a metal and a ceramic material, that it can provide such a firm bond so as to withstand heating at elevated temperatures in a range up to 800° C. or higher and that it is capable of being easily worked or used within conventional coating or bonding processes.

SUMMARY OF THE INVENTION

The present invention provides a novel heat resistant metal-containing inorganic composition having the above-described desirable properties and which is further capable of exhibiting very strong adhesion without peeling even when heated at an elevated temperature or when subjected to repeated heat shocks with wide and rapid temperature changes.

The heat-resistant metal-containing inorganic composition of the present invention comprises, as the essential components thereof, (a) a metal powder, such as iron, copper, silver and the like.

(b) a powder of an inorganic compound having cation-exchangeability and layered or lamellar structure, such as mica, and (c) a silicate or an aluminate of an alkali metal as a binder,
wherein the largest particle diameter of the lamellar inorganic compound, which can be layered minerals, is smaller than the average particle diameter of the metal powder.

The advantages of the above defined inventive composition, which may be used as a heat-resistant coating material or an adhesive agent, are as follows:

(1) Coating or adhesive bonding with the inventive composition can be performed very easily, and in contrast to the prior art methods, no specific apparatus and difficult procedures are required, such as in the CVD method, and welding method.

(2) The surface of a ceramic article can be provided with a metallic coating film using a very simple coating process, even at temperatures as low as room temperature.

(3) The adhesive bonding obtained with the inventive composition between metals, between ceramics, or between a metal and a ceramic is very strong, and the bond has sufficient heat-resistance to withstand heating at temperature changes over a wide range and up to 800° C.

(4) The coating or adhesive bonding obtained with the inventive composition is highly resistant against repeated heat shock treatments and does not peel.

DETAILED DESCRIPTION OF THE PREFERRED EMBODIMENTS

The metal powders suitable as the component (a) in the inventive composition are exemplified by powders of iron, copper, silver, chromium, nickel, titanium and the like as well as alloys of at least two types of these metals. In other words, the metal powders can be used either singly or as a combination of two or more types, according to need. The metal power is preferably substantially free from coarse particles having a particle diameter of larger than 44 μm. When the composition contains a considerable amount of coarse metal particles, difficulties are encountered; for example, when a thin coating film is formed with such a composition on a ceramic or other substrate material surface, the coating film is susceptible to peeling when it is subjected to rapid temperature changes. The particle diameter of the metal powder should be smaller than 44 μm.

The component (b), which is a powder of an inorganic compound having cation-exchangeability having layered or lamellar structure is exemplified by various types of natural minerals, such as pyrophyllite, talc, muscovite, phlogopite, sericite, illite, glauconite, celadonite, clintonites, montmorillonite, nontronite, saponite, vermiculite, kaolinite, dickite, nacrite, halloysite, hydrated halloysite, antigorite, etc., and synthesized minerals of the same type. When the inventive composition is desired to exhibit a stable, adhesive bonding even when subjected to quenching after heating at a temperature of 500° C. or higher, the layered minerals should preferably contain no hydroxy groups in the structure, and have the cation-exchangeability and a well-developed layered structure. It is further desirable that the inorganic compound powders having a layered structure be swellable in water. In this respect, natural micas and synthetic water-swellable micas are preferred. These layered inorganic compound powders provide an absorbing or buffering action or function so as to mitigate against strains in the coating layer or in the adhesive layer caused by the difference in the thermal expansion relative to the substrate and the coating layer or the adhesive layer when they undergo a temperature change.

The weight ratio of the amount of the layered inorganic compound powder as the component (b) to the metal powder is preferably in the range from 10:90 to 90:10. When the amount of the layered inorganic compound is smaller than 10% by weight, sufficient absorbing or buffering cannot be obtained, resulting in that the coating layer or adhesive layer may peel by temperature changes due to temperature elevation or cooling. When the amount thereof is excessively large or over 90% by weight, the particles having a layered structure in the coating layer or adhesive layer are oriented in parallel to the substrate surface with the c-axis perpendicular to the surface, resulting in insufficient absorbing or buffering action being exhibited by the particles having a layered structure so that the coating layer or adhesive layer is also readily peeled off by temperature changes.

It is also important that the layered inorganic compound powders are substantially free from coarse particles having diameters larger than the average particle diameter of the metal powder. In this respect, the particles of the layered inorganic compound should preferably have a diameter substantially smaller than 30 μm. When the inventive composition contains layered inorganic compound having considerable amounts of particles coarser than the average particle diameter of the metal powder, the desired absorbing or buffering action of the lamellar inorganic compound in the inventive composition is reduced when subjected to temperature changes.

The layered mineral compound powders may be used either singly or as a combination of two or more types, according to need.

The component (c) in the inventive composition is a binder, such as an alkali silicate or an alkali aluminate. Suitable alkali silicates are exemplified by #1, #2, #3 and #4 sodium silicates, sodium orthosilicate, sodium sesquisilicate, sodium metasilicate, potassium silicate, lithium silicate and the like. The use of the sodium silicates is economically advantageous because potassium and lithium silicates are expensive. The alkali aluminate is exemplified by lithium aluminate, sodium aluminate and potassium aluminate. The use of sodium aluminate is economically advantageous because aluminates other than sodium aluminate are expensive.

The amount of the binder to be added to the inventive composition can be adequately determined depending on the desired fluidity of the composition. The water content of the binder material which is lost by drying is desirably 90% by weight or less. The use of a binder material containing 90% by weight or more of water in the inventive composition disadvantageously decreases the strength of an adhesive bond formed therewith. The amount of the binder material, calculated as solid, is preferably in the range from 15 to 50% by weight based on the total amount of the aggregate composed of the metal powder and the layered inorganic compound. When the amount of the binder is smaller than 15% by weight, the adhesive bonding strength of the coating layer may be insufficient. On the other hand, an excessively large amount of the binder or over 50% by weight is undesirable due to the decreased heat resistance of the resultant composition.

The inventive composition is easily usable or workable at room temperature in conventional coating methods, such as brush coating, spraying and the like. Upon evaporation of the water from the inventive composition, strong adhesion is obtained so that the surface of a metal or ceramic substrate can be provided with a strong coating layer of metallic nature. Also, upon evaporation of water from the inventive composition, a very firm adhesive bond can be obtained between articles of metals, articles of ceramics or a metal article and a ceramic article. The adhesive bonding thus obtained is very strong and stable in temperatures from 100° to 800° C. This adhesive bonding of the inventive composition is strong, stable and does not peel even when it is subjected to rapidly repeating temperature changes.

The mechanism for the excellent adhesive bonding and the stability against temperature changes exhibited by the inventive composition is not well understood. It is presumable that certain types of chemical reactions may take place between the substrate surface and the alkali silicate or alkali aluminate as the binder. For example, a hydroxoferrate is formed on the surface of an iron substrate coated at room temperature with the inventive composition, which exhibits good adhesion; $NaFeO_2$ is also formed by heating, thereby forming a chemical linkage which exhibits excellent adhesion. When the substrate is composed of inorganic oxides such as ceramics or glasses, the chemical bonding may be obtained mainly with a siloxane linkage of silicon-oxygen-silicon, which also provides excellent adhesion.

While the interaction between the lamellar or layered inorganic compound and the alkali silicate or alkali aluminate is also not well understood, it is presumable that the strength of the coating layer is obtained by the physiochemical bonding between the binder and the lamellar or layered inorganic compound, which is caused by the interlaminar intrusion exchanging between the cations of the lamellar or layered inorganic compound and, those of the alkali silicate or alkali aluminate. The stability of the coating layer against temperature changes may be obtained by the lamellar particles of the inorganic compound which absorb or buffer strains caused by the differences in the thermal expansion between the substrate surface and the coating or adhesive layer formed with the inventive composition.

In the following, the present invention is described in further detail by way of examples. In the examples, the formulation of the compositions is expressed in parts by weight in all cases.

EXAMPLE 1

Coating compositions were prepared by uniformly blending the metal powder, lamellar or layered inorganic compound powder and binder in the amounts indicated in Table 1 below. Each of the compositions was applied onto the surface of test panels of iron, copper, silver, glass and alumina ceramic followed by drying. The thus coated test panels were subjected to 50 repeated cycles, each including rapidly heating to 300° C. or 500° C. followed by quenching. After the 50 repeated cycles the test panels were examined for determining the resistance of the coating material against peeling. The results are shown in the table for the compositions Nos. 1 to 7 together with the results obtained with two comparative compositions Nos. 8 and 9 and a conventional coating material No. 10. Comparative compositions Nos. 8 and 9 were prepared in the same manner as inventive compositions Nos. 1 to 7. Coating material No. 10 is a commercial product of silicone sealant in the form of a pasty compound curable into rubbery elastomer. The results of the peeling test are illustrated in the table in three grades of A, B and C. Grade A represents excellent adhesion with no peeling. Grade B represents partial peeling. Grade C represents complete peeling of the coating layer of the entire coated area.

It is clear from Table 1 that the inventive compositions Nos. 1 to 7 have unexpected superior adhesiveness when compared to comparative compositions Nos. 8 and 9.

In testing the heat-resistance of comparative composition No. 10, the coating peeled off after only a single cycle of heating and quenching.

EXAMPLE 2

Each of the compositions Nos. 1 and 7 prepared in Example 1 was used for adhesively bonding two test panels either of the same type or of different types. The respective test specimens obtained thereby were subjected to 50 repeated cycles, each cycle being composed of rapid heating to 500° C. followed by quenching. The adhesive bonding strength between the panels of the test specimens after the 50 repeated cycles was determined and the results in kg/cm$^2$ are shown in Table 2. As is shown in the table, the adhesive bonding strength obtained with compositions Nos. 1 to 7 was large and in the range from 2.5 to 70 kg/cm$^2$, even after 50 repeated cycles of rapid heating and quenching. On the other hand, the test panels bonded together by use of the comparative compositions Nos. 8 to 10 shown in Table 1 were all separated after only a single cycle of rapid heating and quenching so that no measurable adhesive bonding strength could be attained. Accordingly, this Example illustrates the unexpectedly superior adhesive bonding properties of the inventive compositions.

TABLE 2

| Combination of panels | Composition No | | | | | | |
|---|---|---|---|---|---|---|---|
| | 1 | 2 | 3 | 4 | 5 | 6 | 7 |
| Iron vs. iron | 7.0 | 6.0 | 60 | 6.5 | 70 | 60 | 65 |
| Iron vs. stainless steel | 4.0 | 3.5 | 40 | 2.5 | 30 | 25 | 40 |
| Iron vs. quartz glass | 4.0 | 4.0 | 35 | 4.0 | 30 | 30 | 40 |
| Iron vs. alumina ceramic | 5.0 | 4.0 | 25 | 4.0 | 30 | 35 | 40 |
| Iron vs. copper | 7.0 | 6.5 | 60 | 7.0 | 70 | 60 | 65 |
| Copper vs. copper | 7.5 | 5.5 | 70 | 6.5 | 60 | 60 | 65 |

What is claimed is:

1. A heat-resistant inorganic composition which consists essentially of a metal powder, a powder of an inorganic compound having cation-exchangeability and layered structure and a binder of an alkali metal silicate or an alkali metal aluminate, the largest particle diameter of the inorganic compound having a layered structure is smaller than the average particle diameter of the metal powder,
    wherein the weight ratio of the metal powder to the inorganic compound having a layered structure is in the range from 10:90 to 90:10, and substantially all the inorganic compound having a layered structure has a particle diameter not exceeding 30 μm.

TABLE 1

| | Composition No. | Inventive composition | | | | | | | Comparative composition | | |
|---|---|---|---|---|---|---|---|---|---|---|---|
| | | 1 | 2 | 3 | 4 | 5 | 6 | 7 | 8 | 9 | 10 |
| Metal powder | Iron —40 μm | 85 | 80 | | | 40 | 70 | | 100 | | |
| | Copper —30 | | | 70 | | 40 | | | | 5 | |
| | Silver —40 | | | | 70 | | | 75 | | | |
| Lamellar inorganic compound | Bentonite —8 | 15 | | | 15 | | 10 | | | 95 | |
| | Kaolinite —5 | | 20 | | 15 | 10 | | | | | |
| | Phlogopite —5 | | | | | | | 25 | | | |
| | Swellable artificial mica | | | 30 | | 10 | 20 | | | | |
| Binder | #1 sodium silicate (40% aqueous solution) | 50 | 60 | 50 | 60 | | | | 50 | | |
| | Sodium aluminate (50% aqueous solution) | | | | | 50 | 50 | 60 | | 50 | |
| 50 cycles of rapid heating to 300° C. & quenching | Iron Panel | B | B | A | B | A | A | A | C | C | C |
| | Copper panel | B | B | A | B | A | A | A | C | C | C |
| | Silver panel | B | B | A | B | A | A | A | C | C | C |
| | Quartz glass panel | B | B | A | B | A | A | A | B | B | B |
| | Alumina ceramic panel | B | B | A | B | A | A | A | B | B | B |
| 50 cycles of rapid heating to 500° C. & quenching | Iron panel | B | B | A | B | A | A | A | C | C | C |
| | Copper panel | B | B | A | B | A | A | A | C | C | C |
| | Silver panel | B | B | A | B | A | A | A | C | C | C |
| | Quartz glass panel | B | B | A | B | A | A | A | B | C | C |
| | Alumina ceramic panel | B | B | A | B | A | A | A | B | C | C |

2. The heat-resistant inorganic composition as claimed in claim 1, wherein the metal powder is composed substantially of the particles having a particle diameter not exceeding 44 μm.

3. The heat-resistant inorganic composition as claimed in claim 1, wherein the inorganic compound having layered structure is a natural mica or an artificially synthesized mica.

4. The heat-resistant inorganic composition as claimed in claim 1, wherein the amount of the binder of the alkali metal silicate or alkali metal aluminate is in the range from 15 to 50% by weight based on the total amount of the metal powder and the powder of the inorganic compound having a layered structure.

5. The heat-resistant inorganic composition as claimed in claim 1 or 4, wherein the binder is selected from the group consisting of sodium silicate and sodium aluminate.

6. A heat-resistant inorganic composition which consists essentially of:
   a metal powder substantially composed of particles having a particle diameter not exceeding 44 μm,
   a powder of an inorganic compound having cation-exchangeability and a layered structure, substantially all the inorganic compound having a layered structure has a particle diameter not exceeding 30 μm, and
   a binder of an alkali metal silicate or an alkali metal aluminate in an amount of 15 to 50% by weight based on the total of the metal powder and the powder of the inorganic compound having a layered structure,
   wherein the largest particle diameter of the inorganic compound having a layered structure is smaller than the average particle diameter of the metal powder.

* * * * *